US012087463B2

(12) United States Patent
Volin et al.

(10) Patent No.: US 12,087,463 B2
(45) Date of Patent: Sep. 10, 2024

(54) ATOMIC OBJECT CONFINEMENT APPARATUS WITH RADIO FREQUENCY ELECTRODE SHAPING FOR PERIODIC BOUNDARY CONDITIONS

(71) Applicant: Quantinuum LLC, Broomfield, CO (US)

(72) Inventors: Curtis Volin, Marietta, GA (US); Christopher Langer, Highlands Ranch, CO (US); David Hayes, Broomfield, CO (US)

(73) Assignee: Quantinuum LLC, Broomfield, CO (US)

( * ) Notice: Subject to any disclaimer, the term of this patent is extended or adjusted under 35 U.S.C. 154(b) by 45 days.

(21) Appl. No.: 18/049,845

(22) Filed: Oct. 26, 2022

(65) Prior Publication Data

US 2023/0187095 A1 Jun. 15, 2023

Related U.S. Application Data

(60) Provisional application No. 63/265,211, filed on Dec. 10, 2021.

(51) Int. Cl.
*G21K 1/00* (2006.01)
*G06N 10/40* (2022.01)

(52) U.S. Cl.
CPC ............. *G21K 1/003* (2013.01); *G06N 10/40* (2022.01)

(58) Field of Classification Search
CPC ............................... G21K 1/003; G06N 10/40
USPC ........................................................ 250/251
See application file for complete search history.

(56) References Cited

U.S. PATENT DOCUMENTS

| | | | |
|---|---|---|---|
| 9,000,364 B2 | 4/2015 | Ermakov et al. | |
| 2010/0084549 A1 | 4/2010 | Ermakov et al. | |
| 2015/0093881 A1 | 4/2015 | Chen et al. | |
| 2019/0042677 A1 | 2/2019 | Matsuura et al. | |
| 2020/0066925 A1* | 2/2020 | Tombs | G06F 3/044 |
| 2023/0125251 A1* | 4/2023 | Baldwin | G06F 15/78 |
| | | | 712/36 |

FOREIGN PATENT DOCUMENTS

| | | |
|---|---|---|
| CN | 111936997 A | 11/2020 |
| JP | 2010-509732 A | 3/2010 |
| TW | I179029 B | 2/2021 |

OTHER PUBLICATIONS

English Translation of JP Office Action dated Jan. 15, 2024 for JP Application No. 2022197250, 3 page(s).

(Continued)

*Primary Examiner* — Nicole M Ippolito
(74) *Attorney, Agent, or Firm* — Alston & Bird LLP

(57) ABSTRACT

Atomic object confinement apparatuses that include RF busses and systems including atomic object confinement apparatuses that include RF busses are provided. An example atomic object confinement apparatus comprises RF rail electrodes and an RF bus electrode(s). The RF rail electrodes form a periodic array of confinement segments within a central zone of the atomic object confinement apparatus and the RF bus electrodes are disposed in a perimeter zone disposed about the central zone. The RF rail electrodes and the RF bus electrode(s) are configured to generate a substantially periodic array of trapping regions when an oscillating voltage signal is applied to the RF rail electrodes and the RF bus electrode(s).

20 Claims, 9 Drawing Sheets

(56) References Cited

OTHER PUBLICATIONS

English Translation of TW Office Action, including Search Report, dated Dec. 18, 2023 for TW Application No. 111147440, 5 page(s).
Extended European Search Report Mailed on Apr. 6, 2023 for EP Application No. 22211918, 8 page(s).
JP Decision to Grant Mailed on Jan. 15, 2024 for JP Application No. 2022197250, 3 page(s).
Kielpinski, D., et al., "Architecture for a large-scale ion-trap quantum computer", Nature, Jun. 13, 2002, pp. 709-711, vol. 417, Nature Publishing Group, Germany.
Kumph, Muir, et al., "Operation of a planar-electrode ion-trap array with adjustable RF electrodes", first submitted on Feb. 4, 2014 Cornell University arXiv Jul. 16, 2014 version retrieved from the Internet at https://arxiv.org/pdf/1402.0791.pdf, 17 pages.
TW Office Action, including Search Report, Mailed on Dec. 18, 2023 for TW Application No. 111147440, 5 page(s).
Wright, Kenneth, et al., "Reliable transport through a microfabricated X-junction surface-electrode ion trap", New Journal of Physics, Mar. 4, 2013, 12 pages, vol. 15, No. 3, article 033004, Institute of Physics Publishing Ltd, Great Britain.
English translation of JP Search report dated Jan. 10, 2024 for JP Application No. 2022197250, 11 page(s).
English translation of TW Notice of Allowance dated Feb. 16, 2024 for TW Application No. 111147440, 4 page(s).
JP Search report Mailed on Jan. 10, 2024 for JP Application No. 2022197250, 8 page(s).
TW Notice of Allowance Mailed on Feb. 16, 2024 for TW Application No. 111147440, 4 page(s).

* cited by examiner

ATOMIC OBJECT CONFINEMENT APPARATUS WITH RADIO FREQUENCY ELECTRODE SHAPING FOR PERIODIC BOUNDARY CONDITIONS

CROSS-REFERENCE TO RELATED APPLICATIONS

This application claims priority to U.S. Application No. 63/265,211, filed Dec. 10, 2021, the content of which is hereby incorporated by reference in its entirety.

TECHNICAL FIELD

Various embodiments relate to multi-dimensional atomic object confinement apparatuses. For example, various embodiments relate to two-dimensional atomic object confinement apparatuses with periodic arrays of trapping regions. For example, various embodiments relate to quantum computer comprising a multi-dimensional atomic object confinement apparatus.

BACKGROUND

Quantum charge-coupled devices (QCCD) architecture is one type of architecture that can be used for large-scale quantum computation. According to QCCD architecture, a plurality of atomic objects are confined by an atomic object confinement apparatus and controlled evolution of the quantum state of the atomic objects is used to perform quantum computations. In various scenarios, the atomic object confinement apparatus may comprise a periodic array of trapping regions. For example, the periodic array of trapping regions may enable the parallelization of various operations such as transport, cooling, or qubit gating. However, the edges of the array lead to perturbations in the electrical and/or magnetic field within the atomic object confinement apparatus.

These perturbations can cause perturbations in the periodicity of the location of the positions where the atomic objects are confined from cell-to-cell of the periodic array, affecting the accuracy of operations performed with lasers or any other applied fields, such as electrode voltages, microwaves or magnetic fields, which are shared or distributed (i.e., broadcast) across multiple cells of the array with the intent to perform simultaneous operations in multiple cells. These perturbations can also lead to changes in the motional frequencies of atomic objects in different cells of the periodic array, similarly affecting the accuracy of broadcast operations. Through applied effort, ingenuity, and innovation many deficiencies of such prior atomic object confinement apparatuses and systems incorporating such atomic object confinement apparatuses therefore have been solved by developing solutions that are structured in accordance with the embodiments of the present invention, many examples of which are described in detail herein.

BRIEF SUMMARY OF EXAMPLE EMBODIMENTS

Example embodiments provide multi-dimensional atomic object confinement apparatuses and/or systems comprising multi-dimensional atomic object confinement apparatuses that are formed from a substantially periodic array of one-dimensional confinement segments connected via junctions. In various embodiments, the one-dimensional confinement segments, also referred to as legs herein, of the substantially periodic array are located in a central zone of the atomic object confinement apparatus. The substantially periodic array is defined at least in part by a plurality of radio frequency (RF) rail electrodes. When an oscillating voltage signal (e.g., an RF oscillating voltage signal) is applied to the RF rail electrodes, the RF rail electrodes generate a trapping pseudopotential in the form of an array of linear trapping regions and junctions within the central zone of the atomic object confinement apparatus. Due to the finite length and/or existence of edges of the RF rail electrodes, the trapping pseudopotential within the central zone of the atomic object confinement apparatus includes perturbations to the periodicity of the trapping pseudopotential and/or the array of trapping regions.

Various embodiments include one or more RF bus electrodes in addition to the RF rail electrodes. The one or more RF bus electrodes are disposed at least partially about the perimeter of the central zone of the atomic object confinement apparatus. For example, the RF bus electrodes are disposed in a perimeter zone that is located about the central zone of the atomic object confinement apparatus, in various embodiments. The RF bus electrodes are configured such that, when the oscillating voltage signal is applied to the one or more RF bus electrodes (in addition to the oscillating voltage signal being applied to the one or more RF rail electrodes), the perturbations to the periodicity of the array of trapping regions formed by the trapping pseudopotential within the central zone of atomic object confinement apparatus are reduced and/or mitigated. For example, in various embodiments, the RF bus electrodes are configured such that, when the oscillating voltage signal is applied to the one or more RF bus electrodes, the array of trapping regions and/or the trapping pseudopotential within the central zone of the atomic object confinement apparatus is substantially periodic.

In various embodiments, the trapping pseudopotential is used to confine one or more atomic objects by the atomic object confinement apparatus (e.g., within respective trapping regions of the array of trapping regions). In an example embodiment, the atomic object confinement apparatus is an ion trap, such as a surface ion trap, Paul trap, and/or the like. In an example embodiment, an atomic object is an ion, atom, multi-ion or multi-atom group or crystal, neutral or ionic molecules, and/or the like. In an example embodiment, the atomic object confinement apparatus is part of a quantum processor and/or quantum computer and one or more atomic objects confined by the atomic object confinement apparatus are used as qubits of the quantum processor and/or quantum computer.

According to a first aspect, an atomic object confinement apparatus is provided. In an example embodiment, the atomic object confinement apparatus comprises a plurality of electrodes. The plurality of electrodes comprises a plurality of RF rail electrodes. The plurality of RF rail electrodes is arranged to define, at least in part, a periodic array of confinement segments. The plurality of RF rail electrodes is configured such that, when an oscillating voltage signal is applied thereto, the plurality of RF rail electrodes generate a pseudopotential in the form of an array of trapping regions configured to contain at least one atomic object within a respective trapping region of the array of trapping regions. The plurality of electrodes further comprises one or more RF bus electrodes disposed about at least a portion of a perimeter zone of the atomic object confinement apparatus. The one or more RF bus electrodes are configured such that, when the oscillating voltage signal is applied thereto, the one or more RF bus electrodes cause the array of trapping regions to be substantially periodic.

In an example embodiment, the plurality of RF rail electrodes are disposed in a periodic arrangement, wherein the periodic arrangement is defined at least in part by a tiling cell.

In an example embodiment, a portion of the one or more RF bus electrodes comprises one or more perimeter cells that are at least partial copies of the tiling cell disposed in the perimeter zone.

In an example embodiment, the one or more RF bus electrodes comprises a continuous electrode that extends substantially along at least one edge of the perimeter zone.

In an example embodiment, the continuous electrode is substantially rectangular in shape.

In an example embodiment, the continuous electrode comprises electrode portions that each extend along a respective edge of the perimeter zone.

In an example embodiment, each electrode portion is one of either (a) substantially rectangular or (b) gradient-edged.

In an example embodiment, at least one electrode portion has a width that changes along a length of the at least one electrode portion.

In an example embodiment, the at least one electrode portion is narrowest at a middle of the at least one electrode portion.

In an example embodiment, the one or more RF bus electrodes comprise one or more corner features, each corner feature disposed at a respective corner of the perimeter zone.

In an example embodiment, the one or more RF bus electrodes comprise a plurality of distinct RF bus electrodes.

In an example embodiment, each distinct RF bus electrode of the plurality of distinct RF bus electrodes extends from a respective end of a respective one or pair of the plurality of RF rail electrodes.

According to another aspect, an atomic object confinement apparatus is provided. In an example embodiment, the atomic object confinement apparatus comprises one or more RF rail electrodes and one or more RF bus electrodes. At least a subset of the one or more RF rail electrodes are disposed in a central zone of the atomic object confinement apparatus and the RF bus electrodes are disposed about in a perimeter zone of the atomic object confinement apparatus. The perimeter zone is disposed about the central zone. The one or more RF rail electrodes and the one or more RF bus electrodes are configured such that when an oscillating voltage signal is applied to the one or more RF rail electrodes and the one or more RF bus electrodes, the one or more RF rail electrodes and one or more RF bus electrodes generate a periodic array of trapping regions in at least a part of the central zone of the atomic object confinement apparatus.

According to still another aspect, a quantum computer is provided. In an example embodiment, the quantum computer comprises an atomic object confinement apparatus. The atomic object confinement apparatus comprises a plurality of electrodes. The plurality of electrodes comprise a plurality of RF rail electrodes. The plurality of RF rail electrodes are arranged to define, at least in part, a periodic array of confinement segments. The plurality of RF rail electrodes are configured such that, when an oscillating voltage signal is applied thereto, the plurality of RF rail electrodes generate an array of trapping regions configured to contain at least one atomic object within a respective trapping region of the array of trapping regions. The plurality of electrodes further comprises one or more RF bus electrodes disposed about at least a portion of a perimeter zone of the atomic object confinement apparatus. The one or more RF bus electrodes are configured such that, when the oscillating voltage signal is applied thereto, the one or more RF bus electrodes cause the array of trapping regions to be substantially periodic.

In an example embodiment, the quantum computer further comprises a controller; and a voltage source, wherein the controller is configured to cause the voltage source to generate the oscillating voltage signal.

In an example embodiment, the quantum computer further comprises a manipulation source; and one or more optical elements configured to guide a manipulation signal generated by the manipulation source such that the manipulation signal is incident on two or more positions within the substantially periodic array of trapping regions, the two or more positions being at respective same points in the period of the substantially periodic array of trapping regions.

In an example embodiment, atomic object confinement apparatus is configured to confine two or more atomic objects and the manipulation signal is configured to perform an operation on at least two of the two or more atomic objects, each of the at least two atomic objects located at a respective one of the two or more positions when the manipulation signal is incident on the two or more positions.

In an example embodiment, the plurality of RF rail electrodes are disposed in a periodic arrangement, wherein the periodic arrangement is defined at least in part by a tiling cell, and wherein a portion of the one or more RF bus electrodes comprises one or more perimeter cells that are at least partial copies of the tiling cell disposed in the perimeter zone.

In an example embodiment, the one or more RF bus electrodes comprise a continuous electrode that extends substantially along at least one edge of the perimeter zone.

In an example embodiment, wherein the one or more RF bus electrodes comprise a plurality of distinct RF bus electrodes.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

Figure 6:
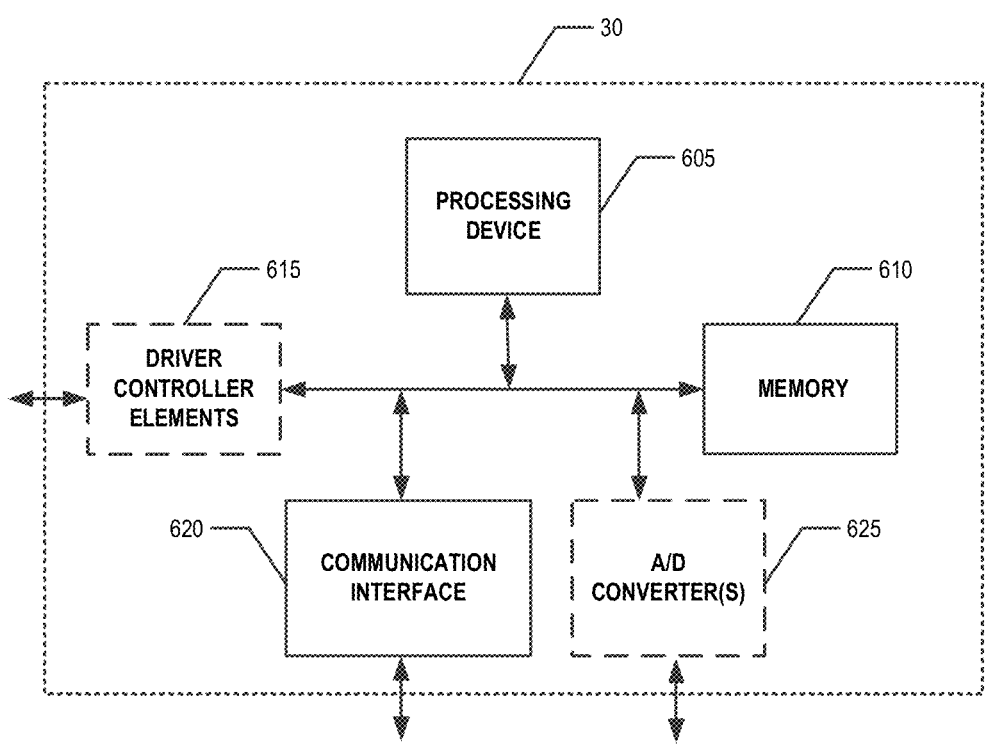
Figure 7:
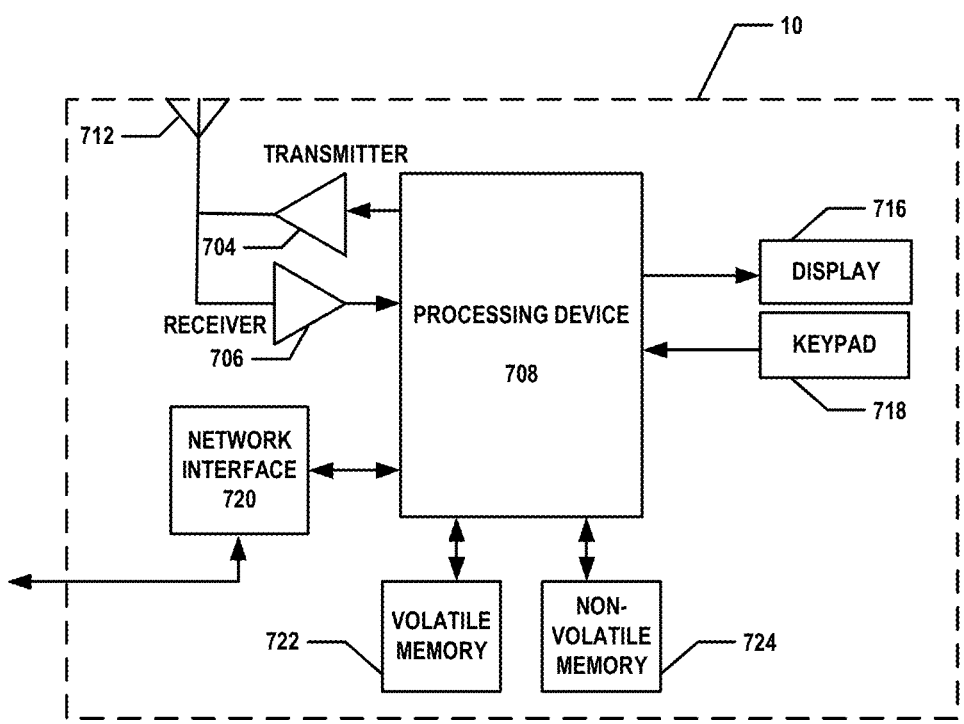

FIG. 6 provides a schematic diagram of an example controller of a quantum computer, according to various embodiments; and FIG. 7 provides a schematic diagram of an example computing entity of a quantum computer system that may be used in accordance with an example embodiment.

DETAILED DESCRIPTION OF SOME EXAMPLE EMBODIMENTS

The present invention now will be described more fully hereinafter with reference to the accompanying drawings, in which some, but not all embodiments of the invention are shown. Indeed, the invention may be embodied in many different forms and should not be construed as limited to the embodiments set forth herein; rather, these embodiments are provided so that this disclosure will satisfy applicable legal requirements. The term "or" (also denoted "/") is used herein in both the alternative and conjunctive sense, unless otherwise indicated. The terms "illustrative" and "exemplary" are used to be examples with no indication of quality level. The terms "generally" and "approximately" refer to within engineering and/or manufacturing limits and/or within user measurement capabilities, unless otherwise indicated. Like numbers refer to like elements throughout.

In various embodiments, a multi-dimensional (e.g., two dimensional) atomic object confinement apparatus is provided. The multi-dimensional atomic object confinement apparatus comprises a plurality of electrodes. In various embodiments, the plurality of electrodes comprises a plurality of RF rail electrodes. The plurality of RF rail electrodes define, at least in part, a periodic array of one-dimensional confinement segments (also referred to herein as legs). In various embodiments, the periodic array of one dimensional confinement segments is substantially disposed within a central zone of the atomic object confinement apparatus. For example, substantially all and/or the majority of the periodic array of confinement segments are disposed within the central zone, while a smaller portion of the periodic array of confinement segments may be disposed in a perimeter zone of the atomic object confinement apparatus. The one dimensional confinement segments are connected via junctions such that atomic objects confined by the atomic object confinement apparatus can be transported between respective ones of the one dimensional confinement segments through the corresponding junction(s). Each of the one-dimensional confinement segments of the periodic array of one dimensional confinement segments is configured to trap atomic objects in a substantially one-dimensional trapping region. The substantially one dimensional trapping region is generated and/or formed by applying an (RF) oscillating voltage signal to the RF rail electrodes that (at least partially) define the periodic array of confinement segments. In particular, application of an oscillating voltage signal to the RF rail electrodes causes the generation of a trapping pseudopotential configured to confine atomic objects in the periodic array of confinement segments.

Since the periodic array of confinement segments is finite and/or has edges, effects caused by the edge of the periodic array of confinement segments result in perturbations in the periodicity of the trapping pseudopotential in the central region of the atomic object confinement apparatus. In other words, due to the perturbations caused by array edge effects, the array of trapping regions is generally quasi-periodic within the central zone rather than substantially periodic. These perturbations reduce the ability to efficiently perform parallelization of operations based on the topology of the array of trapping regions with high fidelity. For example, the perturbations affect the periodicity of the electrical and/or magnetic fields across the atomic object confinement apparatus. These perturbations can cause changes in the location of the positions where the atomic objects are confined from cell-to-cell of the periodic array, impacting the alignment of lasers and the accuracy of broadcasted direct current signals. These perturbations can also lead to changes in the motional frequencies of atomic objects in different cells of the periodic array, affecting the accuracy of operations performed with broadcast lasers or any other applied fields, such as microwaves or magnetic fields. Thus, technical problems exist as to how to mitigate the array edge effects on the operation of the atomic object confinement apparatus.

Various embodiments provide technical solutions to these technical problems. For example, in various embodiments, the atomic object confinement apparatus comprises an RF bus configured to, when an (RF) oscillating voltage signal is applied thereto, mitigate the array edge effects such that the array of trapping regions within the central zone of the atomic object confinement apparatus is substantially periodic. For example, in various embodiments, the plurality of electrodes of the atomic object confinement apparatus comprise one or more RF bus electrodes in addition to the RF rail electrodes. In various embodiments, the one or more RF bus electrodes are disposed in a perimeter zone that is disposed about the central zone (which generally comprises and/or contains the periodic array of confinement segments). The RF bus electrodes are configured such that, when the oscillating voltage signal is applied thereto, the trapping pseudopotential within the central portion of the atomic object confinement apparatus is substantially periodic. For example, the RF bus electrodes are configured such that, when the oscillating voltage signal is applied thereto, perturbations to the periodicity of the periodic array of trapping regions are reduced and/or mitigated. For example, the electrical and/or magnetic field generated by the application of the oscillating voltage signal to the one or more RF bus electrodes cancels out, reduces, and/or mitigates at least a portion of the edge effect perturbations affecting the central portion of the atomic object confinement apparatus and caused by the finite size of the periodic array of confinement segments. Thus, various embodiments provide technical improvements to the field of atomic object confinement apparatuses, quantum processors, quantum computers, and/or the like.

Moreover, various embodiments provide a system comprising the multi-dimensional atomic object confinement apparatus. For example, various embodiments provide a quantum processor or quantum computer comprising the multi-dimensional atomic object confinement apparatus comprising a plurality of RF rail electrodes and one or more RF bus electrodes that are configured to generate a substantially periodic trapping pseudopotential and/or a substantially periodic array of trapping regions within the central zone of the atomic object confinement apparatus. For example, the system may be a quantum processor configured to perform parallel operations in order to reduce the run time of a quantum circuit such that deeper quantum circuits can be implemented within the coherence time of the qubits (e.g., quantum bits) of the quantum processor.

In various embodiments, the trapping pseudopotential is used to confine one or more atomic objects by the atomic object confinement apparatus. For example, the trapping pseudopotential may form a substantially periodic array of trapping regions within the central zone such that atomic objects may be confined within respective ones of the trapping regions of the substantially periodic array of trapping regions. In an example embodiment, the atomic object confinement apparatus is an ion trap, such as a surface ion trap, Paul trap, and/or the like. In an example embodiment, an atomic object is an ion, atom, multi-ion or multi-atom group or crystal, neutral or ionic molecule, group of neutral or ionic molecules, and/or the like. In an example embodiment, the atomic object confinement apparatus is part of a quantum processor and/or quantum computer and one or more atomic objects confined by the atomic object confinement apparatus are used as qubits of the quantum processor and/or quantum computer.

Figure 1:
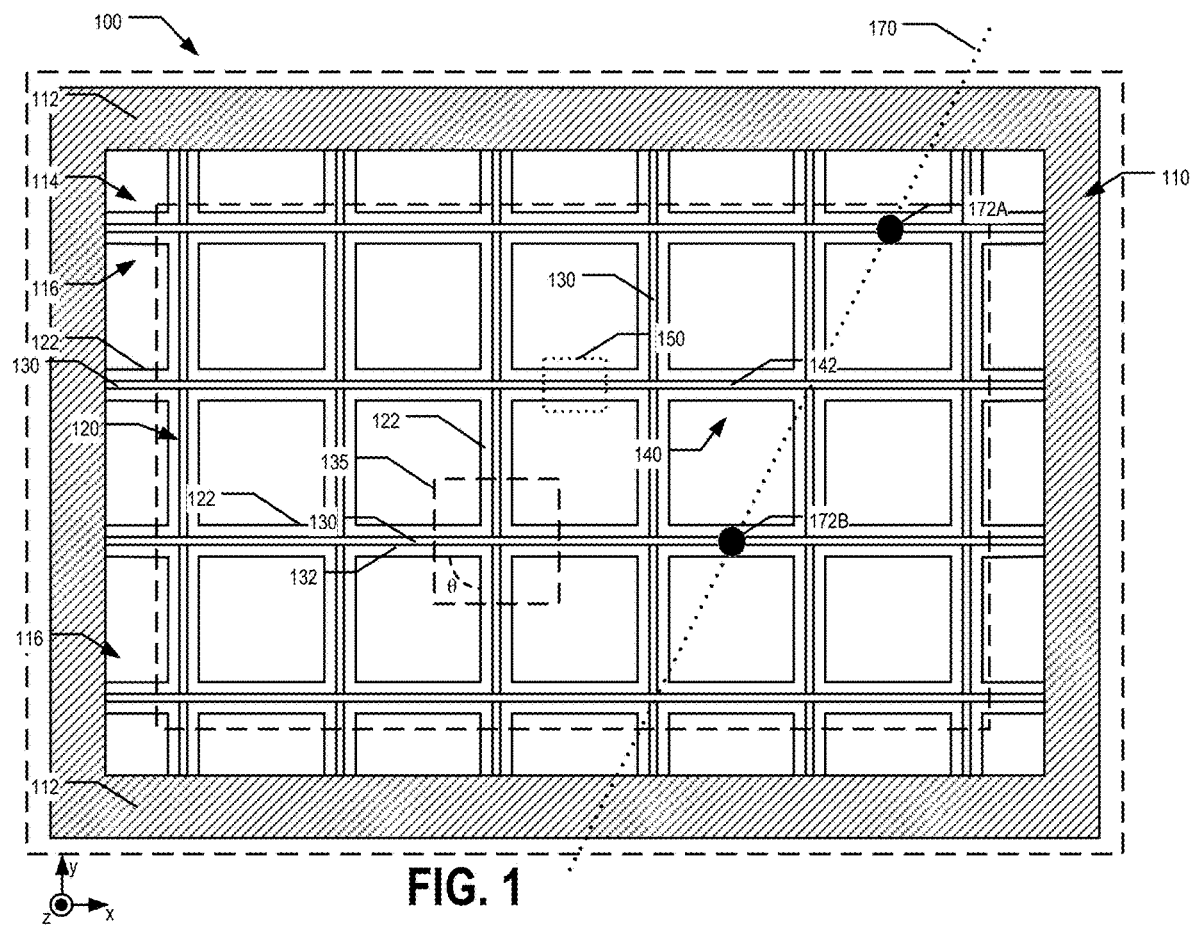
FIG. 1 illustrates an example atomic object confinement apparatus, in accordance with an example embodiment.

FIG. 1 illustrates an atomic object confinement apparatus 100 of an example embodiment. In various embodiments, the atomic object confinement apparatus 100 comprises a plurality of electrodes. The plurality of electrodes comprises RF rail electrodes 122 and RF bus electrodes 112. For example, the atomic object confinement apparatus 100 comprises a central zone 120 comprising a plurality of RF rail electrodes 122. The plurality of RF rail electrodes 122 define, at least in part, a periodic array of confinement segments 132. For example, the atomic object confinement apparatus 100 comprises RF bus electrodes 112 disposed within a perimeter zone 116 of the atomic object confinement apparatus 100. The perimeter zone 116 is disposed about (e.g., about the perimeter of) the central zone 120. In various embodiments, the atomic object confinement apparatus 100 is configured such that atomic objects may be trapped and/or confined (e.g., within respective trapping regions) and/or operations and/or functions may be performed on atomic objects located within the central zone of the atomic object confinement apparatus 100. However, atomic objects are generally not trapped and/or confined within the perimeter zone 116 of the atomic object confinement apparatus 100.

Figure 1A:
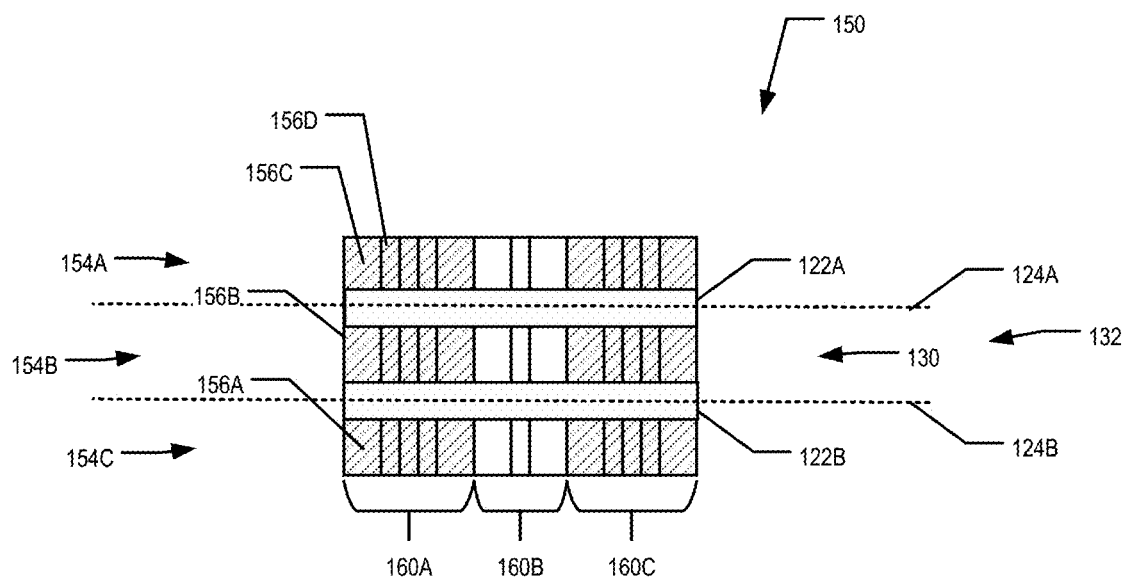
FIG. 1A is a detailed view of a portion of the example atomic object confinement apparatus shown in FIG. 1.

As noted above, the RF rail electrodes 122 define, at least in part, a periodic array of confinement segments 132. FIG. 1A shows a detailed view of the box 150 of FIG. 1. As shown in FIG. 1A, the plurality of electrodes of the atomic object confinement apparatus 100 further comprise sequences and/or series 154 (e.g., 154A, 154B, 154C) of trapping and/or transport (TT) electrodes 156 (e.g., 156A, 156B, 156C, 156D), in various embodiments. When a (RF) oscillating voltage signal is applied to the RF rail electrodes 122, a trapping pseudopotential is generated that is configured to trap and/or confine an atomic object within a one-dimensional trapping region 130 of the array of trapping regions. The one-dimensional trapping region comprises a radio frequency null. The radio frequency null is a one dimensional path that is defined by the direction of weakest pseudopotential gradient. At some points along the radio frequency null the pseudopotential is substantially equal to zero. Thus, the radio frequency null creates a stable one-dimensional trapping region 130. The trapping regions of the atomic object confinement apparatus are substantially defined by the respective radio frequency nulls. For example, the radio frequency null along a one dimensional trapping region 130 defines a transport path along the trapping region along which atomic objects can be transported along the length of the trapping region.

In particular, the RF rail electrodes 122 and the sequences and/or series 154 of TT electrodes 156 form a periodic array of confinement segments 132 or legs of the atomic object confinement apparatus 100 (e.g., within the central zone 120). When the (RF) oscillating voltage signal is applied to the RF rail electrodes 122, an array of trapping regions 130 is generated. For example, atomic objects can be stabilized at respective positions within the array of trapping regions 130 at a particular distance (e.g., approximately 20 μm to approximately 200 μm) above an upper surface of the atomic object confinement apparatus 100 (e.g., the coplanar upper surface of the TT electrodes 154 and RF rail electrodes 122). In other words, the RF rail electrodes 122 and sequences and/or series 154 of TT electrodes define and/or form a physical and/or tangible periodic array of confinement segments and the application of the oscillating voltage to that RF rail electrodes 122 causes the formation and/or generation of the trapping pseudopotential in the form of the array of trapping regions.

In various embodiments, TT electrodes 156 are configured to generate electrical potential wells that cause transport of atomic objects along the corresponding one dimensional trapping region 130 and/or to maintain atomic objects at respective selected positions along the one dimensional trapping region 130. In various embodiments, the RF rail electrodes 122 each define a respective longitudinal axis 124 (e.g., 124A, 124B). In various embodiments, each sequence and/or series 154 of TT electrodes 156 extends substantially parallel to the respective longitudinal axis 124 of a corresponding RF rail electrode 122 for at least a portion of the length of the sequence and/or series of TT electrodes and/or the RF rail electrode. Each sequence and/or series 154 of TT electrodes 156 comprises a plurality of TT electrodes. The TT electrodes may have various widths (e.g., in a direction defined by the respective longitudinal axis 124 of the corresponding RF rail electrode 122) and/or shapes. For example, TT electrode 156D is narrow in a direction defined by the respective longitudinal axis 124A compared to TT electrode 156C. In an example embodiment, each leg and/or confinement segment comprises two RF rail electrodes 122A, 122B and three sequences and/or series 154A, 154B, 154C of TT electrodes 156. For example, a first sequence and/or series 154A may be disposed at least in part along an outer edge of a first RF rail electrode 122A, a second sequence and/or series 154B of TT electrodes 156 may be disposed between the first RF rail electrode 122A and a second RF rail electrode 122B, and a third sequence and/or series 154C of TT electrodes 156 may be disposed at least in part along an outer edge of the second RF rail electrode 122B. In various embodiments, each of the TT electrodes 156 are formed with substantially coplanar upper surfaces that are substantially coplanar with the upper surfaces of the RF rail electrodes 122.

In various embodiments, the TT electrodes 154 are configured to have controlling voltage signals applied thereto such that the TT electrodes 154 generate a time-dependent electric potential field that causes the atomic objects to be transported along the transport path (e.g., along the RF null) for the trapping region 130. Additionally, the controlling voltage signals applied to the TT electrodes 156 may cause atomic objects confined and/or trapped within the trapping region 130 to traverse trajectories that substantially follow and/or are along the RF null. In various embodiments, the controlling voltage signals applied to the TT electrodes 156 have respective time evolutions (possibly due at least in part to the use of a low pass filter) that are slow compared to the time evolution of the (RF) oscillating voltage signals applied to the RF rail electrodes 122 (and RF bus electrodes 112). In an example embodiment, the term slow means the highest frequency Fourier component with substantial non-zero amplitude is slower than the frequency of the (RF) oscillating voltage signal applied to the RF rail electrodes 122 (and RF bus electrodes 112).

In various embodiments, the sequences and/or series 154 of TT electrodes 156 are organized and/or arranged into zones and/or regions 160 (e.g., 160A, 160B, 160C). Various electrodes 156 may be of various sizes and/or shapes. For example, the electrode 156D is narrow in a direction substantially parallel to the adjacent RF rail electrode 122 than the electrode 156C.

Returning to FIG. 1, the RF rail electrodes 122 define, at least in part, a periodic array of confinement segments, at least within the central zone 120 of the atomic object confinement apparatus 100. In various embodiments, the periodic array of confinement segments 132 is formed and/or generated by the periodic recurrence of a tiling cell 135. For example, at least the central zone 120 of the atomic object confinement apparatus 100 may be tiled by copies of the tiling cell 135. For example, the atomic object confinement apparatus 100 may include a tessellation of the tiling cell 135 at least within the central zone 120.

In the embodiments illustrated in FIGS. 1, 2, 3, and 4, the tiling cell 135 is formed by a junction having four one dimensional confinement segments extending therefrom with an angle θ between rotationally adjacent confinement segments of ninety degrees. In various embodiments, the tiling cell 135 may be formed by any number of confinement segments with various angles θ between rotationally adjacent confinement segments, as appropriate for the application. For example, in an example embodiment, the periodic arrangement of copies of the tiling cell 135 may form rectangular and/or square, triangular, hexagonal, and/or other shaped periodic array of confinement segments 132.

Due to various physical constraints (e.g., chip size, cryostat and vacuum chamber size, etc.) the atomic object confinement apparatus 100 is not infinite in size and the periodic array of confinement segments 132 does not extend indefinitely. The array edge effects caused by the edges and/or termination of the periodic array of confinement segments lead to perturbations that affect the periodicity of the trapping pseudopotential and/or the array of trapping regions within the central zone 120 of the atomic object confinement apparatus 100. These perturbations can cause changes in the location of the positions where the atomic objects are confined from cell-to-cell of the periodic array, impacting the alignment of lasers and the accuracy of broadcasted direct current signals. These perturbations can also lead to changes in the motional frequencies of atomic objects in different cells of the periodic array, affecting the accuracy of operations performed with broadcast lasers or any other applied fields, such as microwaves or magnetic field gradients.

Thus, the array edge effects caused by the finite size of the periodic array of confinement segments reduces the fidelity with which parallelized operations can be performed on atomic objects confined by the atomic object confinement apparatus and/or significantly increases the technical complexity of implementing (sufficiently high fidelity) parallelized operations. For example, an example beam path 170 is shown in FIG. 1, where the beam path 170 is an example path along which a manipulation signal (e.g., laser beam) may propagate across the atomic object confinement apparatus 100. Positions 172A and 172B are located at the same points in the phase in the periodicity of the periodic array of confinement segments and/or at respective same points in the period of the periodic array of confinement segments. In order for a manipulation signal propagating along the beam path 170 to efficiently perform parallel operations on atomic objects located respectively at positions 172A and 172B, it is desirable for the trapping pseudopotential to be substantially the same at positions 172A and 172B. As positions 172A and 172B are located at the same points in the phase of the periodicity of periodic array of confinement segments 132, one might expect or assume that the positions 172A and 172B are located at the same points in the phase of the periodicity of the array of trapping regions 130. However, the perturbations caused by the array edge effects of the periodic array of confinement segments 132 cause differences in the trapping pseudopotential at positions 172A and 172B that are significant enough to negatively affect the fidelity of the parallel operations being performed.

Various embodiments of the atomic object confinement apparatus 100 comprise an RF bus 110 disposed in a perimeter zone 116. The perimeter zone 116 is disposed about the perimeter of the central zone 120 of the atomic object confinement apparatus 100. In FIG. 1, the perimeter zone 116 is illustrated as the area between the dashed rectangles. In various embodiments, the RF bus 110 comprises at least one RF bus electrode 112. In various embodiments, the RF bus 110 comprises one or more at least partial perimeter cells 114 (referred to as (partial) perimeter cells herein). For example, the (partial) perimeter cells 114 comprise RF rail electrodes 122 and possibly TT electrodes 154 that are copies of the respective portion(s) of the tiling cell 135. In an example embodiment, the (partial) perimeter cells 114 do not include TT electrodes 154 or include a different topology and/or geometry of TT electrodes than the tiling cells 135 disposed in the central zone 120 of the atomic object confinement apparatus 100. However, the (partial) perimeter cells 114 are generally not used for performing operations on atomic objects. For example, the RF bus 110 of the atomic object confinement apparatus 100 comprises a row of (partial) perimeter cells 114 that are adjacent and/or adjoining to the RF bus electrode 112. The (partial) perimeter cells 114 maintain and/or have the same topology and/or geometry of the confinement segments 132 within the central zone 120 of the atomic object confinement apparatus 100. In various embodiments, the RF bus 110 may comprise one or more rows/columns of (partial) perimeter cells and/or complete perimeter cells, as appropriate for the application.

In various embodiments, the RF bus electrodes 112 are continuous RF bus electrodes. As used herein, a continuous RF bus electrode extends substantially along a length of a side or edge of the perimeter zone 116 of the central zone 120. For example, the RF bus electrode 112 has a length that is substantially equal to (e.g., not substantially less than) the corresponding side or edge of the perimeter zone 116. For example, one RF bus electrode 112 extends along a side or edge of the perimeter zone 116.

In the embodiment illustrated in FIG. 1, the one or more RF bus electrodes 112 comprise two substantially rectangular RF bus electrodes 112 that each extend along a respective edge or side of the perimeter zone 116 of the atomic object confinement apparatus 100. For example, in the illustrated embodiments, the RF bus electrodes 112 extend the length of opposite edges or sides (e.g., the sides defined with constant x-values given the coordinates defined by FIG. 1) of the perimeter zone 116 of the atomic object confinement apparatus 100. In an example, additional RF bus electrodes 112 extend the length of the other opposite edges or sides (e.g., the sides defined with constant y-values given the coordinates defined by FIG. 1) of the perimeter zone 116. In an example embodiment, a single RF bus electrode 112 is formed from substantially rectangular components or electrode portions and extends about the entire perimeter zone 116 and/or about the entire perimeter of the central zone 120.

In various embodiments, the RF bus 110 is configured such that when the (RF) oscillating signal is applied thereto (e.g., to the RF bus electrode 112 and the RF rail electrodes 122 of the (partial) perimeter cells 114), the perturbations caused by the array edge effects to the periodicity of the array of trapping regions 130 is reduced and/or mitigated such that the array of trapping regions 130 and/or the trapping pseudopotential within at least a portion of the central zone 120 is substantially periodic.

Figure 1B:
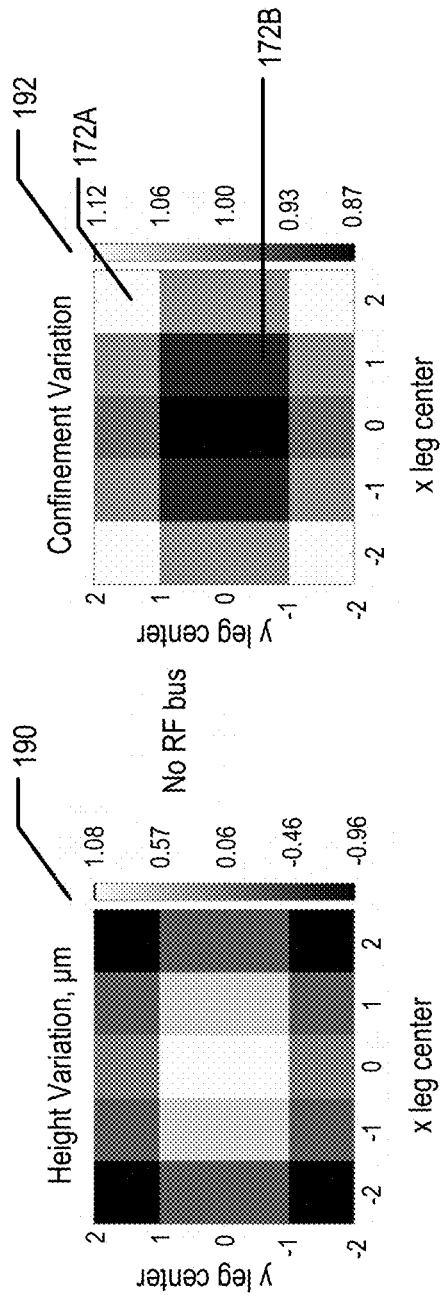
FIG. 1B illustrates the variation in the confinement caused by the trapping pseudopotential at a particular position within an atomic object confinement apparatus that does not include an RF bus and at the particular position within an atomic object confinement apparatus of an example embodiment that does include an RF bus.
Figure 1B:
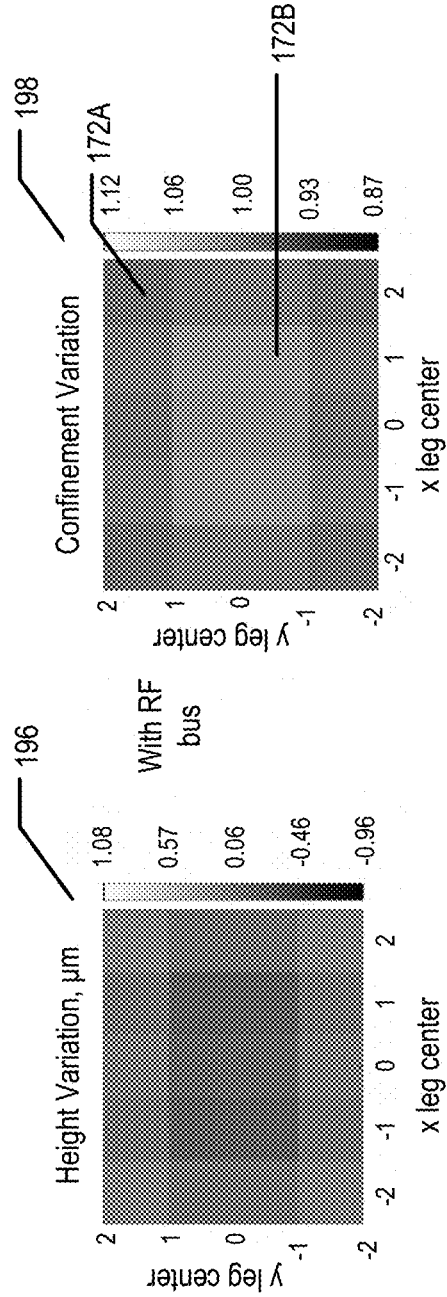

FIG. 1B provides a plot 190 that illustrates the height variation and a plot 192 that illustrates variation in the confinement (as represented by the Laplacian of the trapping pseudopotential) at the respective center points 142 of the horizontal legs (and/or linear/1D trapping segments) 140 when an oscillating RF signal is provided to the RF rail electrodes 122 in the central region 120 but is not applied to the electrodes of the RF bus 110 (e.g., RF rail electrodes 122 located in the perimeter zone 116 and the RF bus electrodes 112). In other words, the plots 190, 192 illustrate the variation in the atomic object height above the surface of the atomic object confinement apparatus and the confinement, respectively, caused by the trapping pseudopotential at the center points 142 of the horizontal legs 140 in an atomic object confinement apparatus that does not include an RF bus. As can be seen in plots 190, 192, the pseudopotential varies significantly between the horizontal legs 140. For example, as can be seen in plot 192, the Laplacian of the trapping pseudopotential is significantly different at point 172A compared to point 172B.

Plot 196 illustrates the height variation and plot 198 illustrates the variation in the confinement (as represented by the Laplacian of the trapping pseudopotential) at the respective center points 142 of the horizontal legs (and/or linear/1D trapping segments) 140 when the oscillating RF signal is provided to the RF rail electrodes 122 in the central zone 120 and applied to the RF bus 110 (e.g., the RF rail electrodes 122 in the perimeter zone 116 and the RF bus electrodes 112). In other words, the plots 196, 198 illustrate the variation in the atomic object height above the surface of the atomic object confinement apparatus and the confinement, respectively, caused by the trapping pseudopotential at the center points 142 of the horizontal legs 140 in an atomic object confinement apparatus 100 that does include an RF bus 110. As can be seen in plots 196, 198, the confinement varies very little across the trapping region as shown in FIG. 1. For example, as can be seen in plot 198, the Laplacian of the trapping pseudopotential is significantly more consistent at points 172A and 172B (e.g., compared to when an RF bus 110 is not present and/or not used, as shown in plot 192). As should be understood, various other metrics illustrate and may be used to quantify the improved periodicity of trapping pseudopotential in an atomic object confinement apparatus 100 that does include an RF bus 110 compared to an atomic object confinement apparatus 100 that does not include an RF bus.

Various embodiments provide atomic object confinement apparatuses comprising various types and/or various shapes of RF buses. Various embodiments provide systems comprising atomic object confinement apparatuses comprising various types and/or various shapes of RF buses. For example, in various embodiments, the number and/or fraction of rows and/or columns of (partial) perimeter cells included in the RF bus may vary. In various embodiments, the RF bus does not include any (partial) perimeter cells. In various embodiments, the RF bus comprises one or more continuous RF bus electrodes. In various embodiments the RF bus comprises a plurality of distinct and/or discreet RF bus electrodes. Some additional example embodiments of RF buses and atomic object confinement apparatuses comprising RF buses will now be described with respect to FIGS. 2, 3, and 4.

Figure 2:
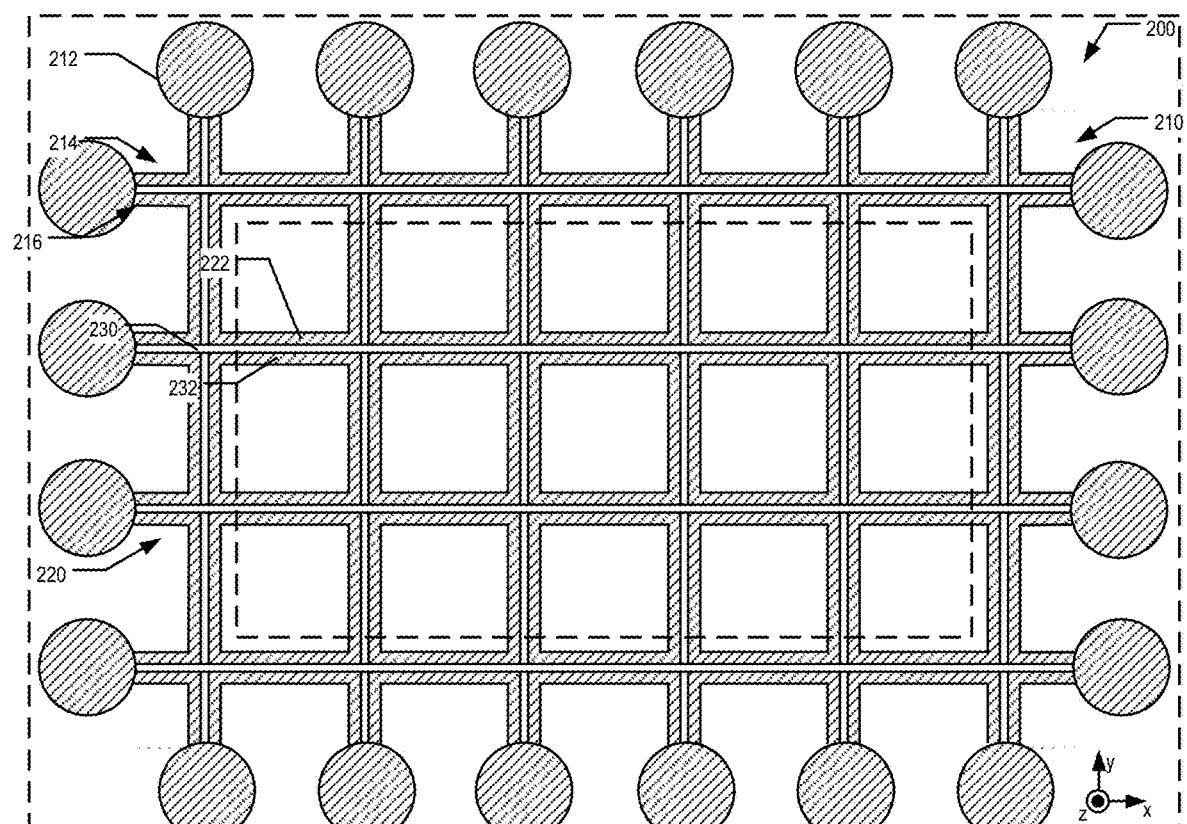
FIG. 2 illustrates another example atomic object confinement apparatus, in accordance with an example embodiment.

FIG. 2 illustrates an example embodiment of an atomic object confinement apparatus 200 comprising an RF bus 210 that includes a plurality of distinct or discrete RF bus electrodes 212. In the illustrated embodiment, the atomic object confinement apparatus 200 comprises a plurality of electrodes. The plurality of electrodes include the plurality of distinct or discrete RF bus electrodes 212, a plurality of RF rail electrodes 222, and a plurality of TT electrodes (similar to as shown in FIG. 1A). Some and/or a majority of the RF rail electrodes 222 are located within the central zone 220 of the atomic object confinement apparatus 200 and some of the RF rail electrodes 222 are located in the perimeter zone 216 disposed about of the perimeter of the central region 220 and form (partial) perimeter cells 214. The perimeter zone 216 is shown in FIG. 2 as the space between the two dashed rectangles. Within the central zone 220 of the atomic object confinement apparatus 200, the RF rail electrodes 222 define a periodic array of one dimensional confinement segments 232.

When an (RF) oscillating voltage signal is applied to the RF rail electrodes 222, a two dimensional array of one dimensional trapping regions 230 is generated within the central zone 220. However, the periodicity of this array of trapping regions 230 is substantially perturbed due to the perturbations caused by array edge effects corresponding to the edge of the two dimensional periodic array of one dimensional confinement segments 232. When the (RF) oscillating voltage signal is applied to both the RF rail electrodes 222 disposed in the central zone 120 and the RF bus 210 (e.g., the RF rail electrodes 122 disposed in the perimeter zone 216 and the RF bus electrodes 212), a substantially periodic two dimensional array of one dimensional trapping regions 230 is generated.

As illustrated in FIG. 2, in various embodiments, the RF bus electrodes 212 are distinct and/or discrete RF bus electrodes 212. A distinct and/or discrete RF bus electrode 212 does not span an entire side or edge of the perimeter zone 214 along a perimeter or side and/or edge of the perimeter of the central zone 220. For example, a plurality of distinct and/or discrete RF bus electrodes 212 may be spaced apart from one another along one or more sides or edges of the perimeter zone 214. For example, in the illustrated embodiment, each distinct and/or discrete RF bus electrode 212 extends from a single pair of RF rail electrodes 222. In other words, in the illustrated embodiment, each distinct and/or discrete RF bus electrode 212 extends from a single confinement segment of a (partial) perimeter cell 214. In an example embodiment, an RF bus electrode 212 extends from one or more confinement segments of respective (partial) perimeter cells 214. In an example embodiment, an RF bus electrode 212 extends from one or more confinement segments of respective (partial) perimeter cells 214 without being directly physically or directly electrically coupled to the RF rail electrodes 222 of the respective (partial) perimeter cells 214 (e.g., separated by gaps or grounded metal). In an example embodiment, the RF bus electrode 212 is formed as a continuation of the one or more confinement segments of the respective (partial) perimeter cells 214 such that the RF bus electrode 212 is directly physically and/or directly electrically coupled to the RF rail electrodes 222.

In the illustrated embodiment, the distinct and/or discrete RF bus electrodes 212 are disposed along opposite sides or edges of the perimeter zone 216. In various embodiments, the distinct and/or discrete RF bus electrodes 212 are disposed along three or four sides or edges of the perimeter zone 216. In an example embodiment, the RF bus 210 may include distinct and/or discrete RF bus electrodes 212 disposed along one or more sides or edges of perimeter zone 216 (e.g., opposite sides or edges) and include continuous RF bus electrodes (e.g., similar to RF bus electrodes 112) along one or more other sides or edges (e.g., the other pair of opposite sides or edges) of the perimeter zone 216.

FIG. 2 illustrates the distinct and/or discrete RF bus electrodes 212 as being round, circular, and/or elliptical. However, in various embodiments, the distinct and/or discrete RF bus electrodes 212 may have various shapes. For example, the distinct and/or discrete RF bus electrodes 212 may be round, triangular, square, rectangular, polygonal, irregular, mimic and/or be similar to the topology and/or geometry of the RF rail electrodes (e.g., the topology and/or geometry of the RF rail electrodes of the tiling cell 135), and/or the like, as appropriate for the application and for reducing and/or mitigating the array edge effect perturbations to the periodicity of the periodic array of trapping regions 230 within the central zone 220 of the atomic object confinement apparatus 200.

Figure 3:
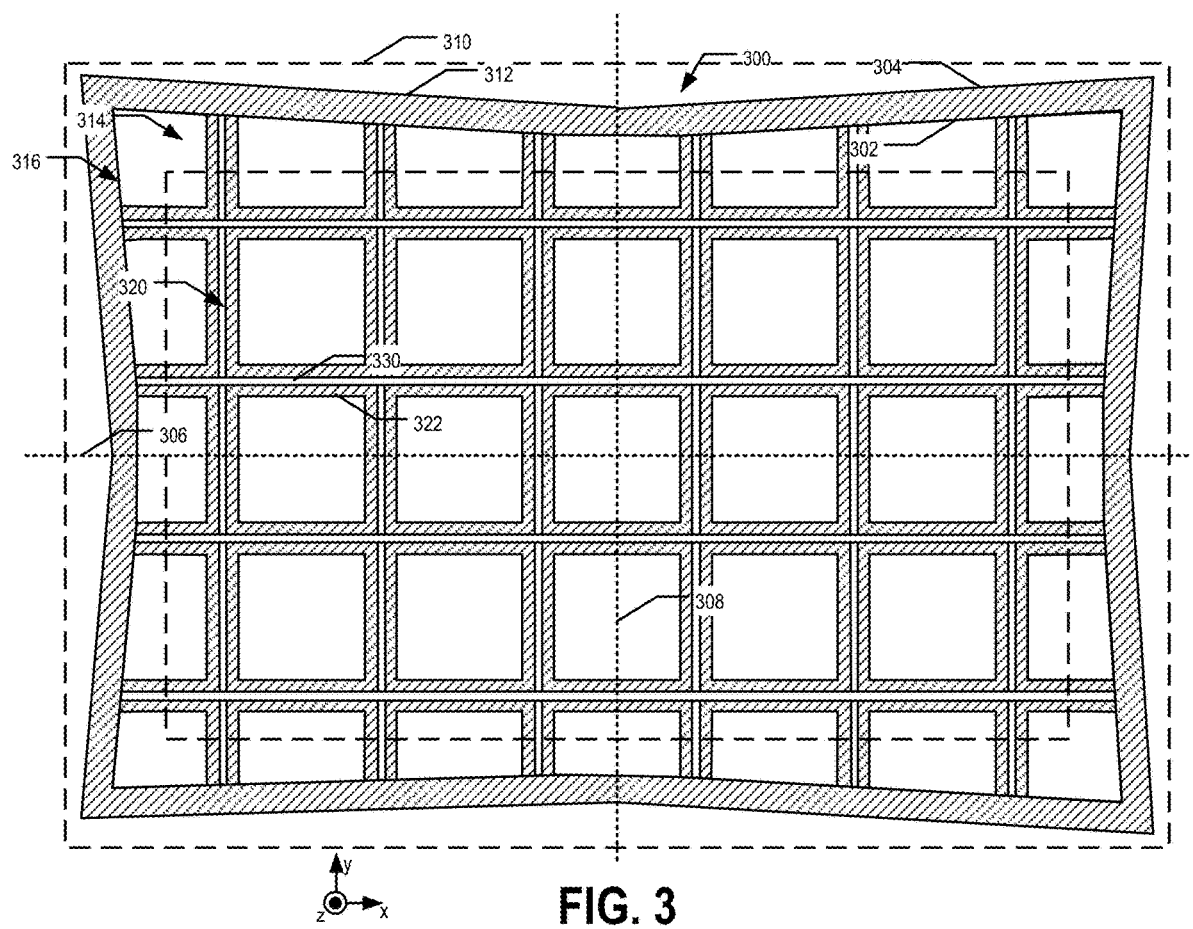
FIG. 3 illustrates an example atomic object confinement apparatus, in accordance with an example embodiment.

FIG. 3 illustrates an example embodiment of an atomic object confinement apparatus 300 comprising an RF bus 310 that includes a continuous gradient-edged RF bus electrode 312. For example, the atomic object confinement apparatus 300 comprises a plurality of electrodes. The plurality of electrodes include the continuous gradient-edged RF bus electrode 312, a plurality of RF rail electrodes 322, and a plurality of TT electrodes (similar to as shown in FIG. 1A). Some of (e.g., a majority of) the RF rail electrodes 322 are located within the central zone 320 of the atomic object confinement apparatus 300 and some of the RF rail electrodes 322 are located (at least in part) in the perimeter zone 316 disposed about the central zone 320 and form (partial) perimeter cells 314. Within the central zone 320 of the atomic object confinement apparatus 300, the RF rail electrodes 322 define a periodic array of one dimensional confinement segments 332.

When an (RF) oscillating voltage signal is applied to the RF rail electrodes 322 of the central zone 320, a two dimensional array of one dimensional trapping regions 330 is generated. However, the periodicity of this array of trapping regions 330 is substantially perturbed due to the perturbations caused by array edge effects corresponding to the edge of the two dimensional periodic array of one dimensional confinement segments 332. When the (RF) oscillating voltage signal is applied to both the RF rail electrodes 322 of the central zone 320 and the RF bus 310 (e.g., the RF rail electrodes 322 located in the perimeter zone 316 and the RF bus electrodes 312), a substantially periodic two dimensional array of one dimensional trapping regions 330 is generated.

As illustrated in FIG. 3, in various embodiments, the RF bus electrodes 312 are continuous gradient-edged RF bus electrodes 312. As described above, a continuous RF bus electrode extends substantially along an edge or side of the perimeter zone 316. As shown in FIG. 3, a gradient-edged RF bus electrode 312 has a gradient or slant to one or both edges or sides 302, 304 of the RF bus electrode 312 (e.g., rather than being substantially rectangular like the RF bus electrodes 112 illustrated in FIG. 1). For example, in an example embodiment, the interior edge 302 of the RF bus electrode 312 is a function of both x and y, given the coordinate definition shown in FIG. 3. For example, in an example embodiment, the outer edge 304 of the RF bus electrode 312 is a function of both x and y, given the coordinate definition shown in FIG. 3. In an example embodiment, the interior edge 302 is constant with respect to a respective one of x or y and the outer edge 304 of the RF bus electrode 312 is a function of both x and y such that the width of the RF bus electrode 312 changes along its length. For example, a pair of the interior edges 302 of the RF bus electrode(s) 312 may have a constant x value and the other pair of interior edges 302 of the RF bus electrode(s) 312 may have a constant y value, while the exterior edges 304 of all of the RF bus electrodes 312 may be slanted, diagonal, and/or a (non-trivial) function of both x and y. In an example embodiment, the RF bus electrodes 312 are narrowest and/or the atomic object confinement apparatus 300 is narrowest at the axes of reflection symmetry 306, 308. For example, the RF bus electrodes 312 are narrowest (e.g., have their smallest width) at their midlines, in an example embodiment. In an example embodiment, the RF bus electrodes 312 are widest and/or the atomic object confinement apparatus 300 is widest at the edges of the atomic object confinement apparatus 300. For example, the RF bus electrodes 312 are widest at their distal ends, in an example embodiment.

In various embodiments, the RF bus electrodes 312 comprise a plurality of continuous RF bus electrodes that each substantially span and/or extend along a respective side or edge of the perimeter zone 316. In an example embodiment, the RF bus electrodes 312 on opposite sides or edges of the perimeter zone 316 are mirror images of one another (e.g., reflected over the respective axis of reflection symmetry 306 or 308). In various embodiments the RF bus 310 comprises multiple RF bus electrodes 312 with adjacent, adjoining, and/or abutting RF bus electrodes 312 not in direct electrical communication with one another (e.g., separated from one another by a gap or grounded metal, for example). In an example embodiment, the RF bus electrode 312 is one electrode that extends substantially about the perimeter zone 316. For example, the RF bus electrode 312 may be formed as a single electrode that extend about the entire perimeter zone 316 and/or perimeter of the central zone 320.

Figure 4:
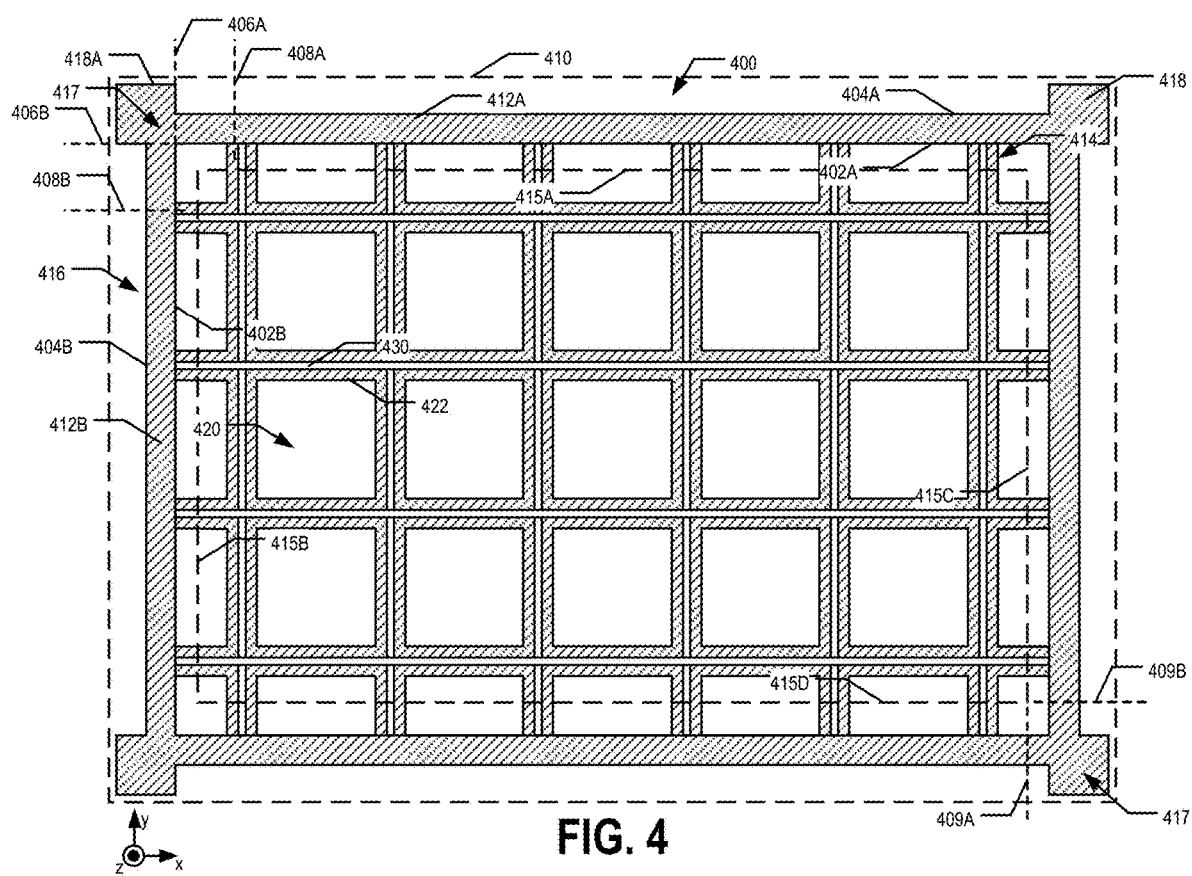
FIG. 4 illustrates another example atomic object confinement apparatus, in accordance with an example embodiment.

FIG. 4 illustrates an example embodiment of an atomic object confinement apparatus 400 comprising an RF bus 410 that includes RF bus electrodes 412 (e.g., 412A, 412B) that include corner features 418. For example, the atomic object confinement apparatus 400 comprises a plurality of electrodes. The plurality of electrodes include the RF bus electrodes 412 including corner features 418, a plurality of RF rail electrodes 422, and a plurality of TT electrodes (similar to as shown in FIG. 1A). Some of (e.g., a majority of) the RF rail electrodes 422 are located within the central zone 420 of the atomic object confinement apparatus 400 and some of (e.g., a minority of) the RF rail electrodes 422 are located (at least in part) in the perimeter zone 416 disposed about the central zone 420 and form (partial) perimeter cells 414. Within the central zone 420 of the atomic object confinement apparatus 400, the RF rail electrodes 422 define, at least in part, a periodic array of one dimensional confinement segments 432.

When an (RF) oscillating voltage signal is applied to the RF rail electrodes 422 of the central zone 420, a two dimensional array of one dimensional trapping regions 430 is generated. However, the periodicity of this array of trapping regions 430 is substantially perturbed due to the perturbations caused by array edge effects corresponding to the edge of the two dimensional periodic array of one dimensional confinement segments. When the (RF) oscillating voltage signal is applied to both the RF rail electrodes 422 of the central zone 420 and the RF bus 410 (e.g., the RF rail electrodes 422 disposed in the perimeter zone 416 and the RF bus electrodes 412 (including the corner features 418)), a substantially periodic two dimensional array of one dimensional trapping regions 430 is generated.

As illustrated in FIG. 4, in various embodiments, the RF bus electrodes 412 are continuous electrodes that include corner features 418. The corner features 418 are disposed at the corners of the perimeter zone 416 and are RF bus electrodes and/or portions of an RF bus electrode 412 that have a different topology and/or geometry compared to the portions of the RF bus electrode 412 that is not part of the corner feature 418 (e.g., that substantially extends on the side or edge of the perimeter zone). For example, the first corner feature 418A illustrated in FIG. 4 extends out past the outer edge 404A of the first RF bus electrode 412A and extends out past the outer edge 404B of the second RF bus electrode 412B.

In an example embodiment, the first and second RF bus electrodes 412A, 412B are portions of one continuous RF bus electrode that extend substantially about and/or around the perimeter zone 416. In an example embodiment, the first and second RF bus electrodes 412A, 412B are formed as separate electrodes. In an example embodiment, the first corner feature 418A is part of the first and/or second RF bus electrodes 412A, 412B and/or part of a continuous RF bus electrode that extends substantially about the perimeter region 416. In an example embodiment, the corner features 418 are formed as separate RF bus electrodes (e.g., separate from the RF bus electrodes 412 that (substantially) extend along the sides or edges of the perimeter region 416).

In an example embodiment, a first RF bus electrode (and/or RF bus electrode portion) 412A extends substantially along a first side or edge 415A of the perimeter zone 416 of the atomic object confinement apparatus 400 and a second RF bus electrode (and/or RF bus electrode portion) 412B extends substantially along a second side or edge 415B of the perimeter zone 416. The first and second sides or edges 415A, 415B of the perimeter zone 416 meet, about one another, and/or adjoin at corner 417.

In an example embodiment, the first corner feature 418A disposed at corner 417 is formed by changing the width and/or otherwise changing the topology, geometry, and/or surface profile of the RF bus electrodes 412A, 412B. For example, in the illustrated embodiment, the first corner feature 418A is formed by increasing the width of the first and second RF bus electrodes (and/or RF bus electrode portions) 412A, 412B in the vicinity of and/or proximate the corner 417.

In an example embodiment, in the vicinity of and/or proximate the corner 417 is defined as being within the area or sector that extends, faces, and/or opens away from the central region 420 and that is formed by extending a (virtual) line 406B from the interior edge 402B of the second RF bus electrode 412B and extending a (virtual) line 406A from the interior edge 402A of the first RF bus electrode 412A. In an example embodiment, in the vicinity of and/or proximate the corner 417 is defined as being within the area or sector that extends, faces, and/or opens away from the central region 420 and that is formed by extending a (virtual) line 408B from an RF rail electrode 422 that extends transverse to the second edge 415B and that is closest to the corner 417 and extending a (virtual) line 408A from an RF rail electrode 422 that extends transverse to the second edge 415A and that is closest to corner 417. In an example embodiment, in the vicinity of and/or proximate the corner 417 is defined as being within the area or sector that is catercorner to the central region 420. For example, in an example embodiment, in the vicinity of and/or proximate the corner 417 is defined as being within the area or sector that is formed by extending a (virtual) line 409B outward from the third edge 415C of the perimeter region 416 and extending a (virtual) line 409A outward from the fourth edge 415D of the perimeter region 416 where the third and fourth edges 415C, 415D intersect.

In various embodiments, an RF bus is formed by combining various elements of the RF buses 110, 210, 310, and/or 410. For example, in an example embodiment, an RF bus includes gradient-edged RF bus electrodes with corner features. In another example embodiment, an RF bus includes distinct and/or discrete RF bus electrodes and corner features. In an example embodiment, an RF bus includes distinct and/or discrete RF bus electrodes that vary in size along a size of the atomic object confinement apparatus, distance from a corner, distance from the center point of the atomic object confinement apparatus, distance from the edge of the center zone, and/or the like.

Technical Advantages

In order for large scale quantum computations to be performed using QCCD-based quantum processors, parallelization of various operations and/or functions is necessary. In particular, limits on the number of wires connecting an atomic object confinement apparatus of the QCCD-based quantum processor (which is generally disposed within a cryostat and/or vacuum chamber) and the number of connection points or pins of a chip on which the atomic object confinement apparatus is formed set an upper limit on the number of individually operable and/or controllable electrodes of the atomic object confinement apparatus. Additionally, to perform deep quantum circuits generally requires a large number of qubits on which a large number of operations and/or functions are performed. These operations and/or functions need to be performed within the coherence time of the qubits. Once technique for reducing the amount of time required to perform these operations and/or functions, such that the deep quantum circuit can be performed during the coherence time of the qubits, is to perform some of the operations and/or functions in parallel (to the extent allowed by the quantum circuit and/or by the hardware being used). Thus, technical problems exist as to how to enable the parallel performance of operations and/or functions in a QCCD-based quantum processor.

One solution to these problems is to use an atomic object confinement apparatus that includes a periodic array of confinement segments as the base hardware for the QCCD-based quantum processor. For example, the periodic nature of the array of confinement segments can be leveraged to enable the parallelization of various operations and/or functions. However, since the periodic array of confinement segments is finite and/or has edges, effects caused by the edge of the periodic array of confinement segments result in perturbations in the periodicity of the trapping pseudopotential in the central region of the atomic object confinement apparatus. In other words, the finite size and/or edges of the periodic array of confinement segments result in perturbations of the periodicity of the array of trapping regions generated by applying an (RF) oscillating voltage signal to the RF rail electrodes that define, at least in part, the periodic array of confinement segments.

The perturbations to the periodicity of the array of trapping regions reduce the ability to efficiently perform parallelization of operations with high fidelity. For example, the perturbations affect the periodicity of the electrical and/or magnetic fields across the atomic object confinement apparatus (e.g., in the central region thereof, in and/or near the perimeter region, and/or the like). These perturbations can cause changes in the location of the positions where the atomic objects are confined from cell-to-cell of the periodic array, impacting the alignment of lasers and the accuracy of broadcasted direct current signals (e.g., applied to TT electrodes 156 as controlling voltage signals). These perturbations can also lead to changes in the motional frequencies of atomic objects in different cells of the periodic array, affecting the accuracy of operations performed with broadcast lasers or any other applied fields, such as microwaves or magnetic fields. Thus, technical problems exist as to how to mitigate the array edge effects on the operation of the atomic object confinement apparatus.

Various embodiments provide technical solutions to these technical problems. For example, in various embodiments, the plurality of electrodes of the atomic object confinement apparatus comprise one or more RF bus electrodes in addition to the RF rail electrodes. In various embodiments, the one or more RF bus electrodes are disposed about at least a portion of the perimeter region, which is disposed about the central region and/or the periodic array of confinement segments. The RF bus electrodes are configured such that, when the oscillating voltage signal is applied thereto, the trapping pseudopotential within the central portion of the atomic object confinement apparatus is substantially periodic. For example, the RF bus electrodes are configured such that, when the oscillating voltage signal is applied thereto, perturbations to the periodicity of the periodic array of trapping regions are reduced and/or mitigated. For example, the electrical potential generated by the application of the oscillating voltage signal to the one or more RF bus electrodes cancels out, reduces, and/or mitigates at least a portion of the edge effect perturbations affecting the periodicity of the array of trapping regions located in the central region of the atomic object confinement apparatus and caused by the finite size of the periodic array of confinement segments. Thus, various embodiments provide technical improvements to the field of atomic object confinement apparatuses, quantum processors, quantum computers, and/or the like.

Exemplary Quantum Computer Comprising an Atomic Object Confinement Apparatus

Figure 5:
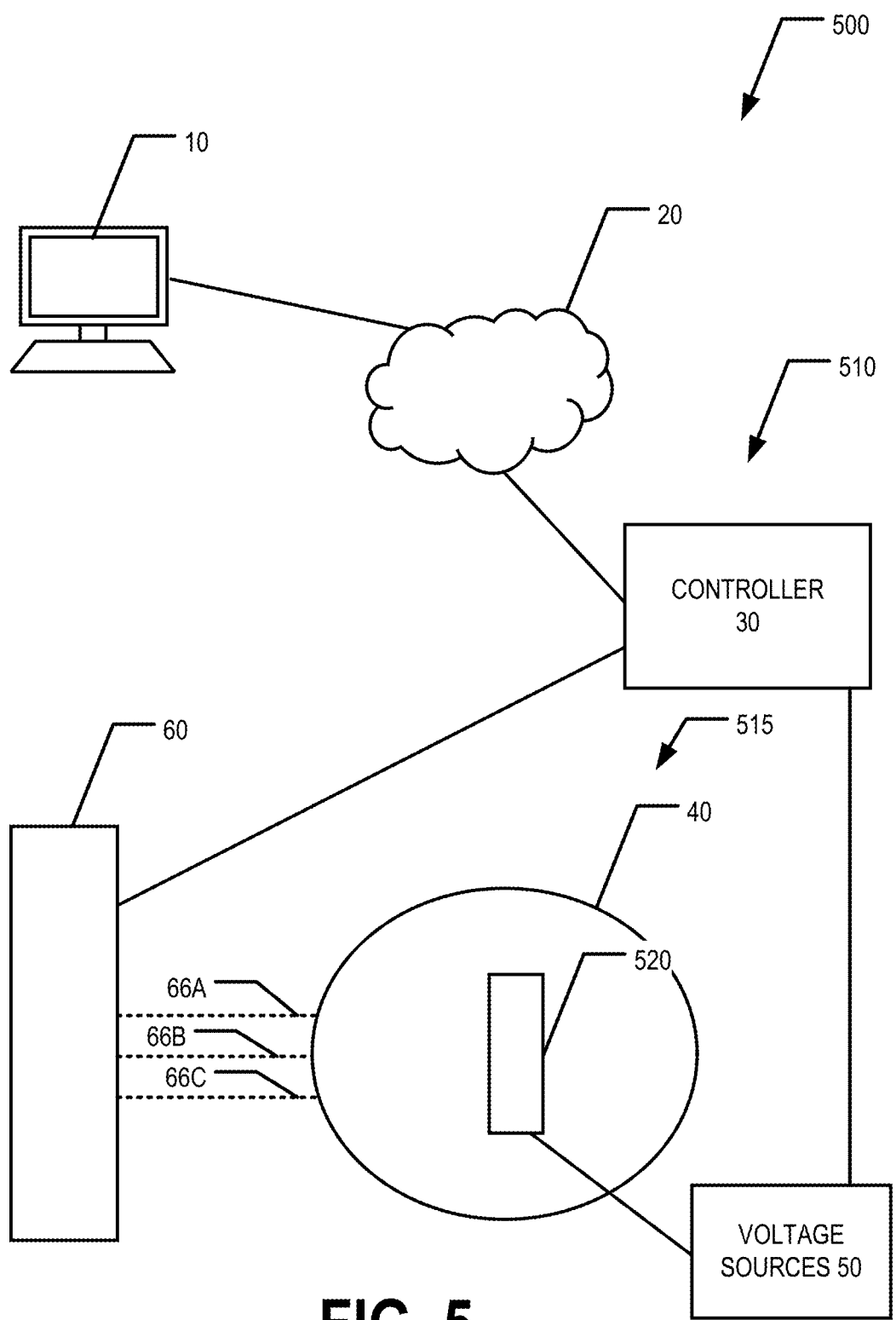
FIG. 5 is a schematic diagram illustrating an example quantum computing system, according to various embodiments.

As described above, the atomic object confinement apparatus 100, 200, 300, 400 may be part of a quantum processor of a quantum computer. For example, the atomic object(s) trapped and/or confined by the atomic object confinement apparatus 100, 200, 300, 400 may be used as qubits of the quantum processor. The configuration of the RF bus electrodes and the RF rail electrodes to form a periodic array of trapping regions (when an (RF) oscillating voltage signal is applied to the RF bus electrodes and the RF rail electrodes) enables the efficient performance of parallel operations by the quantum processor. FIG. 5 provides a schematic diagram of an example quantum computer system 500 comprising an atomic object confinement apparatus 520 (e.g., atomic object confinement apparatus 100, 200, 300, 400, and/or the like) comprising an RF bus, in accordance with an example embodiment. In various embodiments, the quantum computer system 500 comprises a computing entity 10 and a quantum computer 510. In various embodiments, the quantum computer 510 comprises a controller 30 and a quantum processor 515. In various embodiments, the quantum processor 515 comprises an atomic object confinement apparatus 520 (comprising an RF bus) enclosed in a cryostat and/or vacuum chamber 40, one or more voltage sources 50, one or more manipulation sources 60, and/or the like.

In an example embodiment, the one or more manipulation sources 60 comprise one or more lasers (e.g., optical lasers, microwave sources, and/or the like). In various embodiments, the one or more manipulation sources 60 are configured to manipulate and/or cause a controlled quantum state evolution of one or more atomic objects within the atomic object confinement apparatus 520. For example, in an example embodiment, wherein the one or more manipulation sources 60 comprise one or more lasers, the lasers may provide one or more laser beams to the confinement apparatus within the cryostat and/or vacuum chamber 40 (e.g., along respective optical paths 66A, 66B, 66C). The laser beams may be used to perform various operations (e.g., parallel operations), such as enacting one or more quantum gates on one or more qubits, sympathetic cooling of one or more atomic objects, reading a qubit and/or determining a quantum state of an atomic object, initializing an atomic object into the qubit space, and/or the like. In various embodiments, the manipulation sources 60 are controlled by respective driver controller elements 615 (see FIG. 6) of the controller 30.

In various embodiments, the quantum computer 510 comprises one or more voltage sources 50. For example, the voltage sources 50 may comprise a plurality of TT voltage drivers and/or voltage sources and/or at least one RF driver and/or voltage source. The voltage sources 50 may be electrically coupled to the corresponding potential generating elements (e.g., TT electrodes 156, RF rail electrodes, RF bus electrodes) of the atomic object confinement apparatus 520, in an example embodiment. For example, the voltage sources 50 are configured to provide (RF) oscillating voltage signals to the RF rail electrodes and RF bus electrodes of the atomic object confinement apparatus 520. For example, the voltage sources 50 are configured to provide controlling voltage signals to the TT electrodes 156. In various embodiments, the voltages sources 50 are controlled by respective driver controller elements 615 of the controller 30.

In various embodiments, a computing entity 10 is configured to allow a user to provide input to the quantum computer 510 (e.g., via a user interface of the computing entity 10) and receive, view, and/or the like output from the quantum computer 510. The computing entity 10 may be in communication with the controller 30 of the quantum computer 510 via one or more wired or wireless networks 20 and/or via direct wired and/or wireless communications. In an example embodiment, the computing entity 10 may translate, configure, format, and/or the like information/data, quantum circuits, quantum computing algorithms, and/or the like into a computing language, executable instructions, command sets, and/or the like that the controller 30 can understand and/or implement.

In various embodiments, the controller 30 is configured to control the voltage sources 50, cryogenic system and/or vacuum system controlling the temperature and pressure within the cryostat and/or vacuum chamber 40, manipulation sources 60, and/or other systems controlling various environmental conditions (e.g., temperature, pressure, magnetic fields, and/or the like) within the cryostat and/or vacuum chamber 40 and/or configured to manipulate and/or cause a controlled evolution of quantum states of one or more atomic objects within the atomic object confinement apparatus 520. For example, the controller 30 may cause a controlled evolution of quantum states of one or more atomic objects within the atomic object confinement apparatus 520 to execute a quantum circuit and/or algorithm. In various embodiments, the atomic objects confined within the atomic object confinement apparatus 520 are used as qubits of the quantum computer 510 and/or quantum processor 515. For example, the quantum processor 515 may include a plurality of multi-atomic object crystals that each comprise a first atomic object used as a qubit atomic object of the quantum processor and a second atomic object used as a sympathetic cooling atomic object for use in cooling the qubit atomic object of the same multi-atomic object crystal.

Exemplary Controller

In various embodiments, an atomic object confinement apparatus is incorporated into a quantum computer 510. In various embodiments, a quantum computer 510 further comprises a controller 30 configured to control various elements of the quantum computer 510. For example, the controller 30 may be configured to control the voltage sources 50, a cryogenic system and/or vacuum system controlling the temperature and pressure within the cryostat and/or vacuum chamber 40, manipulation sources 60, and/or other systems controlling the environmental conditions (e.g., temperature, humidity, pressure, magnetic fields, and/or the like) within the cryostat and/or vacuum chamber 40 and/or configured to manipulate and/or cause a controlled evolution of quantum states of one or more atomic objects within the atomic object confinement apparatus 520.

As shown in FIG. 6, in various embodiments, the controller 30 may comprise various controller elements including processing elements and/or devices 605, memory 610, driver controller elements 615, a communication interface 620, analog-digital converter elements 625, and/or the like. For example, the processing elements and/or devices 605 may comprise programmable logic devices (CPLDs), microprocessors, coprocessing entities, application-specific instruction-set processors (ASIPs), integrated circuits, application specific integrated circuits (ASICs), field programmable gate arrays (FPGAs), programmable logic arrays (PLAs), hardware accelerators, other processing devices and/or circuitry, and/or the like. and/or controllers. The term circuitry may refer to an entirely hardware embodiment or a combination of hardware and computer program products. In an example embodiment, the processing element and/or device 605 of the controller 30 comprises a clock and/or is in communication with a clock. For example, the processing element and/or device 605 is configured to determine how to cause the quantum processor 515 to perform a quantum circuit using parallel (e.g., simultaneous) operations and then control various aspects of the quantum computer (e.g., by providing instructions to respective driver controller elements 615) to cause the quantum processor 515 to perform the quantum circuit using parallel operations.

For example, the memory 610 may comprise non-transitory memory such as volatile and/or non-volatile memory storage such as one or more of as hard disks, ROM, PROM, EPROM, EEPROM, flash memory, MMCs, SD memory cards, Memory Sticks, CBRAM, PRAM, FeRAM, RRAM, SONOS, racetrack memory, RAM, DRAM, SRAM, FPM DRAM, EDO DRAM, SDRAM, DDR SDRAM, DDR2 SDRAM, DDR3 SDRAM, RDRAM, RIMM, DIMM, SIMM, VRAM, cache memory, register memory, and/or the like. In various embodiments, the memory 610 may store qubit records corresponding the qubits of quantum computer (e.g., in a qubit record data store, qubit record database, qubit record table, and/or the like), a calibration table, an executable queue, computer program code (e.g., in a one or more computer languages, specialized controller language (s), and/or the like), one or more libraries, one or more waveform series for forming controlling voltage signals for controlling the transportation of atomic objects along one dimensional trapping regions and through junctions connecting one dimensional trapping regions and associated meta data, and/or the like. In an example embodiment, execution of at least a portion of the computer program code stored in the memory 610 (e.g., by a processing element and/or device 605) causes the controller 30 to perform one or more steps, operations, processes, procedures and/or the like described herein for tracking the phase, location, and/or the like of an atomic object and/or multi-atomic object crystal within an atomic system and causing the adjustment of the phase of one or more manipulation sources and/or signal(s) generated thereby.

In various embodiments, the driver controller elements 615 may include one or more drivers and/or controller elements each configured to control one or more drivers. In various embodiments, the driver controller elements 615 may comprise drivers and/or driver controllers. For example, the driver controllers may be configured to cause one or more corresponding drivers to be operated in accordance with executable instructions, commands, and/or the like scheduled and executed by the controller 30 (e.g., by the processing element and/or device 605). In various embodiments, the driver controller elements 615 may enable the controller 30 to operate a manipulation source 60, voltage sources 50, and/or the like. In various embodiments, the drivers may be laser drivers; vacuum component drivers; drivers for controlling the flow of current and/or voltage applied to TT electrodes, RF rail electrodes, RF bus electrodes, and/or other electrodes used for maintaining and/or controlling the trapping potential of the atomic object confinement apparatus and/or causing transport of one or more atomic objects; cryogenic and/or vacuum system component drivers; and/or the like. For example, the drivers may control and/or comprise TT and/or RF voltage drivers and/or voltage sources 50 that provide voltages and/or electrical signals (e.g., oscillating voltage signals and/or controlling voltage signals) to the TT electrodes, RF rail electrodes, and/or RF bus electrodes.

In various embodiments, the controller 30 comprises means for communicating and/or receiving signals from one or more optical receiver components such as photodetectors, cameras, MEMs cameras, CCD cameras, photodiodes, photomultiplier tubes, and/or the like of an optics collection system configured to capture, detect, measure, and/or the like optical signals generated by atomic objects trapped and/or confined by the atomic object confinement apparatus 520. For example, the controller 30 may comprise one or more analog-digital converter elements 625 configured to receive signals from one or more optical receiver components, calibration sensors, and/or the like.

In various embodiments, the controller 30 may comprise a communication interface 620 for interfacing and/or communicating with a computing entity 10. For example, the controller 30 may comprise a communication interface 620 for receiving executable instructions, command sets, and/or the like from the computing entity 10 and providing output received from the quantum computer 510 (e.g., from an optical collection system) and/or the result of a processing the output to the computing entity 10. In various embodiments, the computing entity 10 and the controller 30 may communicate via a direct wired and/or wireless connection and/or one or more wired and/or wireless networks 20.

Exemplary Computing Entity

FIG. 7 provides an illustrative schematic representative of an example computing entity 10 that can be used in conjunction with embodiments of the present invention. In various embodiments, a computing entity 10 is configured to allow a user to provide input to the quantum computer 510 (e.g., via a user interface of the computing entity 10) and receive, display, analyze, and/or the like output from the quantum computer 510.

As shown in FIG. 7, a computing entity 10 can include an antenna 712, a transmitter 704 (e.g., radio), a receiver 706 (e.g., radio), and a processing element 708 that provides signals to and receives signals from the transmitter 704 and receiver 706, respectively. The signals provided to and received from the transmitter 704 and the receiver 706, respectively, may include signaling information/data in accordance with an air interface standard of applicable wireless systems to communicate with various entities, such as a controller 30, other computing entities 10, and/or the like. In this regard, the computing entity 10 may be capable of operating with one or more air interface standards, communication protocols, modulation types, and access types. For example, the computing entity 10 may be configured to receive and/or provide communications using a wired data transmission protocol, such as fiber distributed data interface (FDDI), digital subscriber line (DSL), Ethernet, asynchronous transfer mode (ATM), frame relay, data over cable service interface specification (DOCSIS), or any other wired transmission protocol. Similarly, the computing entity 10 may be configured to communicate via wireless external communication networks using any of a variety of protocols, such as general packet radio service (GPRS), Universal Mobile Telecommunications System (UMTS), Code Division Multiple Access 2000 (CDMA2000), CDMA2000 1× (1×RTT), Wideband Code Division Multiple Access (WCDMA), Global System for Mobile Communications (GSM), Enhanced Data rates for GSM Evolution (EDGE), Time Division-Synchronous Code Division Multiple Access (TD-SCDMA), Long Term Evolution (LTE), Evolved Universal Terrestrial Radio Access Network (E-UTRAN), Evolution-Data Optimized (EVDO), High Speed Packet Access (HSPA), High-Speed Downlink Packet Access (HSDPA), IEEE 802.11 (Wi-Fi), Wi-Fi Direct, 802.16 (WiMAX), ultra wideband (UWB), infrared (IR) protocols, near field communication (NFC) protocols, Wibree, Bluetooth protocols, wireless universal serial bus (USB) protocols, and/or any other wireless protocol. The computing entity 130 may use such protocols and standards to communicate using Border Gateway Protocol (BGP), Dynamic Host Configuration Protocol (DHCP), Domain Name System (DNS), File Transfer Protocol (FTP), Hypertext Transfer Protocol (HTTP), HTTP over TLS/SSL/Secure, Internet Message Access Protocol (IMAP), Network Time Protocol (NTP), Simple Mail Transfer Protocol (SMTP), Telnet, Transport Layer Security (TLS), Secure Sockets Layer (SSL), Internet Protocol (IP), Transmission Control Protocol (TCP), User Datagram Protocol (UDP), Datagram Congestion Control Protocol (DCCP), Stream Control Transmission Protocol (SCTP), HyperText Markup Language (HTML), and/or the like.

Via these communication standards and protocols, the computing entity 10 can communicate with various other entities using concepts such as Unstructured Supplementary Service information/data (USSD), Short Message Service (SMS), Multimedia Messaging Service (MMS), Dual-Tone Multi-Frequency Signaling (DTMF), and/or Subscriber Identity Module Dialer (SIM dialer). The computing entity 10 can also download changes, add-ons, and updates, for instance, to its firmware, software (e.g., including executable instructions, applications, program modules), and operating system. In various embodiments, the computing entity 10 comprises one or more network interfaces 720 configured to communicate via one or more wired and/or wireless networks 20.

The computing entity 10 may also comprise a user interface device comprising one or more user input/output interfaces (e.g., a display 716 and/or speaker/speaker driver coupled to a processing element 708 and a touch screen, keyboard, mouse, and/or microphone coupled to a processing element 708). For instance, the user output interface may be configured to provide an application, browser, user interface, interface, dashboard, screen, webpage, page, and/or similar words used herein interchangeably executing on and/or accessible via the computing entity 10 to cause display or audible presentation of information/data and for interaction therewith via one or more user input interfaces. The user input interface can comprise any of a number of devices allowing the computing entity 10 to receive data, such as a keypad 718 (hard or soft), a touch display, voice/speech or motion interfaces, scanners, readers, or other input device. In embodiments including a keypad 718, the keypad 718 can include (or cause display of) the conventional numeric (0-9) and related keys (#, *), and other keys used for operating the computing entity 10 and may include a full set of alphabetic keys or set of keys that may be activated to provide a full set of alphanumeric keys. In addition to providing input, the user input interface can be used, for example, to activate or deactivate certain functions, such as screen savers and/or sleep modes. Through such inputs the computing entity 10 can collect information/data, user interaction/input, and/or the like.

The computing entity 10 can also include volatile storage or memory 722 and/or non-volatile storage or memory 724, which can be embedded and/or may be removable. For instance, the non-volatile memory may be ROM, PROM, EPROM, EEPROM, flash memory, MMCs, SD memory cards, Memory Sticks, CBRAM, PRAM, FeRAM, RRAM, SONOS, racetrack memory, and/or the like. The volatile memory may be RAM, DRAM, SRAM, FPM DRAM, EDO DRAM, SDRAM, DDR SDRAM, DDR2 SDRAM, DDR3 SDRAM, RDRAM, RIMM, DIMM, SIMM, VRAM, cache memory, register memory, and/or the like. The volatile and non-volatile storage or memory can store databases, database instances, database management system entities, data, applications, programs, program modules, scripts, source code, object code, byte code, compiled code, interpreted code, machine code, executable instructions, and/or the like to implement the functions of the computing entity 10.

CONCLUSION

Many modifications and other embodiments of the invention set forth herein will come to mind to one skilled in the art to which the invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:
1. An atomic object confinement apparatus comprising:
a plurality of electrodes comprising a plurality of radio frequency (RF) rail electrodes, the plurality of RF rail electrodes arranged to define, at least in part, a periodic array of confinement segments, wherein the plurality of RF rail electrodes are configured such that, when an oscillating voltage signal is applied thereto, the plurality of RF rail electrodes generate a pseudopotential in the form of an array of trapping regions configured to contain at least one atomic object within a respective trapping region of the array of trapping regions; and the plurality of electrodes further comprising one or more RF bus electrodes disposed about at least a portion of a perimeter zone of the atomic object confinement apparatus, wherein the one or more RF bus electrodes are configured such that, when the oscillating voltage signal is applied thereto, the one or more RF bus electrodes cause the array of trapping regions to be substantially periodic.

2. The atomic object confinement apparatus of claim 1, wherein the plurality of RF rail electrodes are disposed in a periodic arrangement, wherein the periodic arrangement is defined at least in part by a tiling cell.

3. The atomic object confinement apparatus of claim 2, wherein a portion of the one or more RF bus electrodes comprises one or more perimeter cells that are at least partial copies of the tiling cell disposed in the perimeter zone.

4. The atomic object confinement apparatus of claim 1, wherein the one or more RF bus electrodes comprises a continuous electrode that extends substantially along at least one edge of the perimeter zone.

5. The atomic object confinement apparatus of claim 4, wherein the continuous electrode is substantially rectangular in shape.

6. The atomic object confinement apparatus of claim 4, wherein the continuous electrode comprises electrode portions that each extend along a respective edge of the perimeter zone.

7. The atomic object confinement apparatus of claim 6, wherein each electrode portion is one of either (a) substantially rectangular or (b) gradient-edged.

8. The atomic object confinement apparatus of claim 6, wherein at least one electrode portion has a width that changes along a length of the at least one electrode portion.

9. The atomic object confinement apparatus of claim 8, wherein the at least one electrode portion is narrowest at a middle of the at least one electrode portion.

10. The atomic object confinement apparatus of claim 1, wherein the one or more RF bus electrodes comprise one or more corner features, each corner feature disposed at a respective corner of the perimeter zone.

11. The atomic object confinement apparatus of claim 1, wherein the one or more RF bus electrodes comprise a plurality of distinct RF bus electrodes.

12. The atomic object confinement apparatus of claim 11, wherein each distinct RF bus electrode of the plurality of distinct RF bus electrodes extends from a respective end of a respective one or pair of the plurality of RF rail electrodes.

13. An atomic object confinement apparatus comprising: one or more radio frequency (RF) rail electrodes and one or more RF bus electrodes, wherein at least a subset of the one or more RF rail electrodes are disposed in a central zone of the atomic object confinement apparatus and the RF bus electrodes are disposed about in a perimeter zone of the atomic object confinement apparatus that is disposed about the central zone and wherein the one or more RF rail electrodes and the one or more RF bus electrodes are configured such that when an oscillating voltage signal is applied to the one or more RF rail electrodes and the one or more RF bus electrodes, the one or more RF rail electrodes and one or more RF bus electrodes generate a periodic array of trapping regions in at least a part of the central zone of the atomic object confinement apparatus.

14. A quantum computer comprising:
an atomic object confinement apparatus comprising:
a plurality of electrodes comprising a plurality of radio frequency (RF) rail electrodes, the plurality of RF rail electrodes arranged to define, at least in part, a periodic array of confinement segments, wherein the plurality of RF rail electrodes are configured such that, when an oscillating voltage signal is applied thereto, the plurality of RF rail electrodes generate an array of trapping regions configured to contain at least one atomic object within a respective trapping region of the array of trapping regions, and the plurality of electrodes further comprising one or more RF bus electrodes disposed about at least a portion of a perimeter zone of the atomic object confinement apparatus, wherein the one or more RF bus electrodes are configured such that, when the oscillating voltage signal is applied thereto, the one or more RF bus electrodes cause the array of trapping regions to be substantially periodic.

15. The quantum computer of claim 14, further comprising:
a controller; and
a voltage source, wherein the controller is configured to cause the voltage source to generate the oscillating voltage signal.

16. The quantum computer of claim 14, further comprising:
a manipulation source; and
one or more optical elements configured to guide a manipulation signal generated by the manipulation source such that the manipulation signal is incident on two or more positions within the substantially periodic array of trapping regions, the two or more positions being at respective same points in the period of the substantially periodic array of trapping regions.

17. The quantum computer of claim 16, wherein the atomic object confinement apparatus is configured to confine one or more atomic objects and the manipulation signal is configured to perform an operation on at least two of the two or more atomic objects, each of the at least two atomic objects located at a respective one of the two or more positions when the manipulation signal is incident on the two or more positions.

18. The quantum computer of claim 14, wherein the plurality of RF rail electrodes are disposed in a periodic arrangement, wherein the periodic arrangement is defined at least in part by a tiling cell, and wherein a portion of the one or more RF bus electrodes comprises one or more perimeter cells that are at least partial copies of the tiling cell disposed in the perimeter zone.

19. The quantum computer of claim 14, wherein the one or more RF bus electrodes comprise a continuous electrode that extends substantially along at least one edge of the perimeter zone.

20. The quantum computer of claim 14, wherein the one or more RF bus electrodes comprise a plurality of distinct RF bus electrodes.

\* \* \* \* \*